(12) United States Patent
Nakagawa (10) Patent No.: US 7,830,531 B2
(45) Date of Patent: Nov. 9, 2010

(54) DISPLACEMENT DETECTING DEVICE AND OPTICAL INSTRUMENT HAVING THE SAME

(75) Inventor: Hidenori Nakagawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 45 days.

(21) Appl. No.: 12/390,630

(22) Filed: Feb. 23, 2009

(65) Prior Publication Data
US 2009/0213390 A1 Aug. 27, 2009

(30) Foreign Application Priority Data
Feb. 25, 2008 (JP) .............................. 2008-042754

(51) Int. Cl.
G01B 11/14 (2006.01)
(52) U.S. Cl. .................................................... 356/614
(58) Field of Classification Search ................. 356/614; 250/559.29
See application file for complete search history.

(56) References Cited

U.S. PATENT DOCUMENTS 6,975,408 B2 * 12/2005 Igaki et al. .................. 356/616
7,022,974 B2 4/2006 Igaki et al.
7,045,770 B2 5/2006 Igaki et al.
2008/0252904 A1 * 10/2008 Matsumiya et al. ......... 356/614

FOREIGN PATENT DOCUMENTS

| EP | 1 882 908 | 1/2008 |
| GB | 2 280 259 | 1/1995 |
| JP | 2002-323347 | 11/2002 |
| JP | 2003-337052 | 11/2003 |

OTHER PUBLICATIONS

Official Communication in European Patent Application No. 09 00 2580, dated Jul. 16, 2009.

* cited by examiner

*Primary Examiner*—Roy Punnoose
(74) *Attorney, Agent, or Firm*—Fitzpatrick, Cella, Harper & Scinto (57) ABSTRACT

A displacement detecting device includes a light source for projecting light to an object to be examined, the light source being movable relative to the object to be examined, a first reflecting element being fixed to the object to be examined and including a reflection portion for reflecting light from the light source and a non-reflection portion, a first light receiving element for receiving light reflected by the first reflecting element, a second reflecting element fixed to the object to be examined and including a reflection portion for reflecting light from the light source and a non-reflection portion, and a second light receiving element for receiving light reflected by the second reflecting element, wherein the second reflecting element is disposed at a light path through which at least a portion of light from the light source and advancing via the first reflecting element is directed to the second light receiving element.

13 Claims, 10 Drawing Sheets

DISPLACEMENT DETECTING DEVICE AND OPTICAL INSTRUMENT HAVING THE SAME

FIELD OF THE INVENTION AND RELATED ART

This invention relates to a displacement detecting device for measuring displacement information such as a movement amount or rotation amount of a subject to be examined.

Conventionally, there are displacement detecting devices for performing detection of displacement information such as a movement amount or rotation amount of a subject to be examined, using an optical scale (patent documents Nos. 1 and 2).

In patent documents Nos. 1 and 2, a reflection scale comprising a plurality of roof mirrors disposed one-dimensionally and each having two reflection surfaces disposed opposed to each other at a predetermined angle, is provided on the subject to be examined.

Light from a light source is projected on the reflection scale, and displacement information of the subject is detected by receiving the light reflected by the reflection scale with use of a light receiving element.

Figure 12:
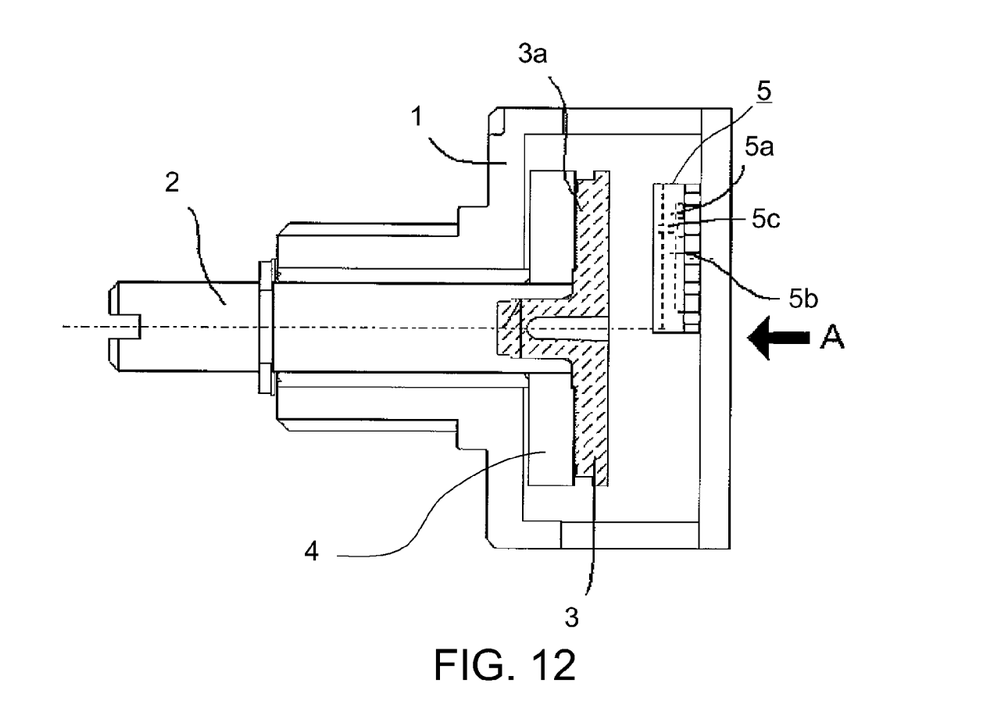
FIG. 12 is a section view of a conventional displacement detecting device configured to perform optical detection.

FIG. 12 is a schematic diagram of a main portion of a conventional displacement detecting device.

In FIG. 12, a main frame 1 of the displacement detecting device is provided with a rotational shaft 2 which is used for the connection with the measurement subject (object to be examined).

Integrally fixed to this rotational shaft 2 are a reflecting element 3 which comprises a transparent material in which a micro-roof array or roof prism array is regularly arranged on the back surface thereof as a reflection pattern 3a, and an abutment 4 for preventing disengagement of the shaft from the main frame 1.

Disposed a position opposed to the reflecting element 3 is a sensor 5 which is comprised of a light source 5a, a first light receiving element 5b and a light blocking plate 5c for isolating the light source and the light receiving element.

The first light receiving element 5b serves to detect the light from the light source 5a and reflected from the reflection pattern 3a of the reflecting element 3.

Based on the signal detected by the first light receiving element 5b, the rotation information (displacement information) of the object to be examined mounted on the rotational shaft 2 is detected.

The displacement detecting device shown in FIG. 12 detects the relative displacement information related to the object to be examined by receiving the light via the reflection pattern 3a.

[Patent Documents]
  No. 1: Japanese Laid-Open Patent Application No. 2002-323347 and corresponding U.S. Pat. No. 6,975,408
  No. 2: Japanese Laid-Open Patent Application No. 2003-337052 and corresponding U.S. Pat. No. 7,022,974

SUMMARY OF THE INVENTION

Figure 13:
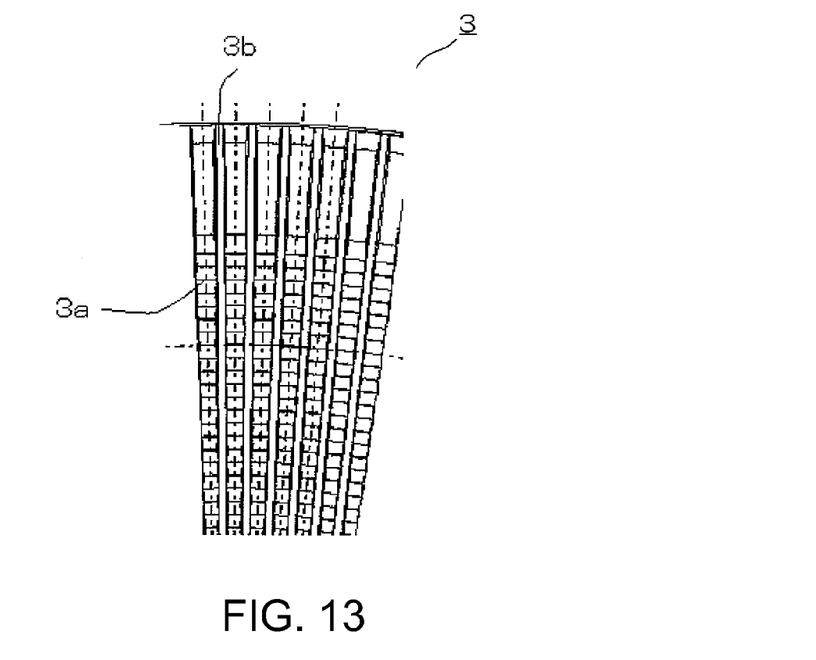
FIG. 13 is a diagram illustrating a main portion of the pattern of a micro-roof array which is a reflecting element.
Figure 14:
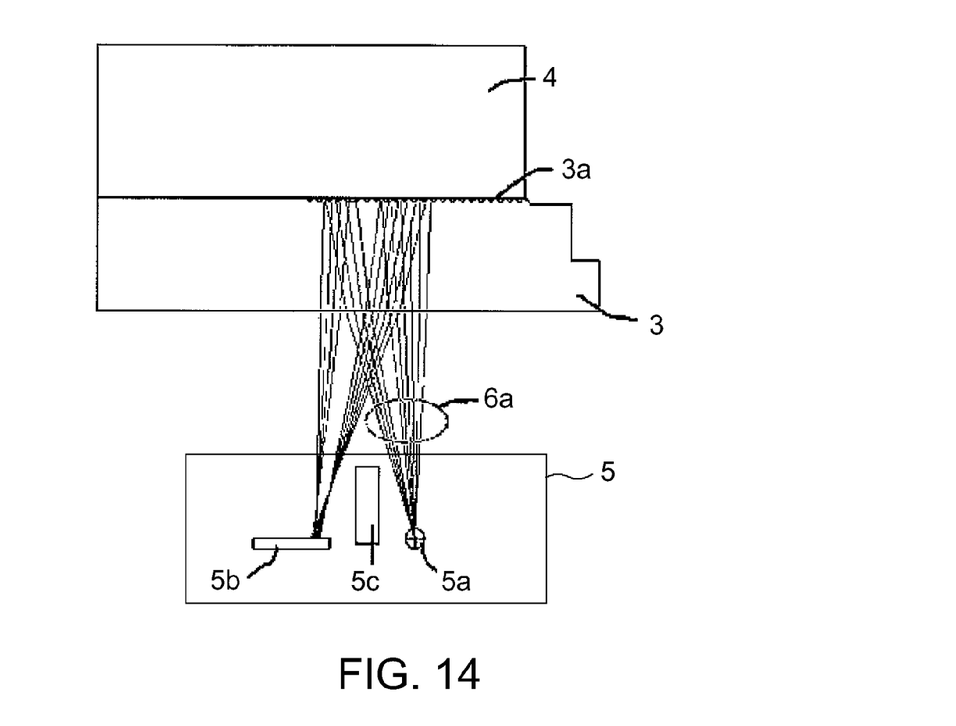
FIG. 14 is a diagram for explaining the reflection light path of s reflecting member (micro-roof array) of a reflecting element.
Figure 15:
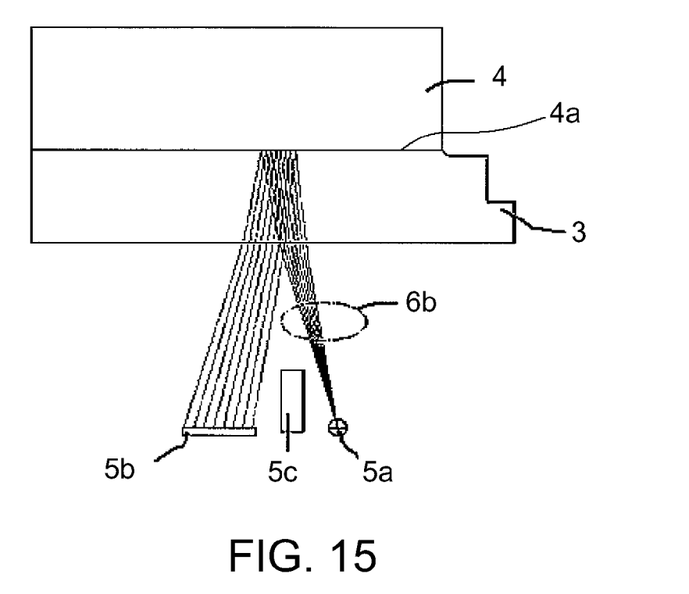
FIG. 15 is a diagram for explaining the reflection light path of a non-reflecting member (trapezoidal protrusion) of the reflecting element.

FIG. 13 is a diagram illustrating the reflecting element 3 in FIG. 12 as seen from the direction A. FIG. 14 is a schematic diagram of main portion of the same, illustrating the light path of the light, of the light from the light source 5a, which is received by the light receiving element 5b after being reflected by the reflection pattern 3a. FIG. 15 is a schematic diagram of a main portion, illustrating the light path of the light reflected at the interface 4a between the reflecting element 3 and the abutment 4 in FIG. 12.

As shown in FIG. 13, the reflecting element 3 is comprised of reflection patterns 3a formed as a micro-roof array and a pattern 3b formed as a non-reflection member of trapezoidal-shape protrusions, and there patterns are formed regularly.

As shown in FIG. 14, the light receiving element 5b is disposed at a position where diffused light from the light source 5a is collected effectively after being reflected by the reflection pattern 3a. Denoted at 6a is the light path of the light, of the light from light source 5a, which is incident on the light receiving element 5b.

Here, it is possible that the reflecting element 3 and the sensor 5 relatively move relative to each other and the reflecting element 3 is shifted to the position of the pattern 3b which is a non-reflecting member. In other words, the reflecting element 3 can be moved to the position of the pattern 3b. In that occasion, as shown in FIG. 15, the light passed through the non-reflecting member 3b is reflected at the interface 4a, and thus a light path 6b, is formed. Then, the light reaches the light receiving element 5b. The light which follows this light path 6b, becomes disturbing light (stray light) which adversely influences the detection light effectively collected by the reflection pattern 5a to cause deterioration of the detection precision.

The present invention provides a displacement detecting device by which the rate of stray light reaching the light receiving element can be reduced such that high accuracy detection is assured.

In accordance with an aspect of the present invention, there is provided a displacement detecting device, comprising: a light source configured to project light to an object to be examined, said light source being movable relative to the object to be examined; a first reflecting element being fixed to the object to be examined and including a reflection portion configured to reflect light from said light source and a non-reflection portion; a first light receiving element configured to receive light reflected by said first reflecting element; a second reflecting element being fixed to the object to be examined and including a reflection portion configured to reflect light from said light source and a non-reflection portion; and a second light receiving element configured to receive light reflected by said second reflecting element; wherein said second reflecting element is disposed at a light path through which at least a portion of light from said light source and advancing via said first reflecting element is directed to said second light receiving element.

The displacement detecting device may further comprise a stray light preventing member disposed at a side of said first reflecting element remote from said first and second light receiving elements, said stray light preventing member having a reflection surface configured to reflect light passed through the non-reflection portion of said first reflecting element to a direction different from the direction toward said first light receiving element, wherein said second reflecting element may be disposed at a light path along which at least a portion of light from said light source passed through the non-reflection portion of said first reflecting element and then reflected by said stray light preventing member is directed to said second light receiving element.

The stray light preventing member may have been treated to decrease reflectance to light passed through the non-reflection portion of said first reflecting element.

The treatment may include use of an antireflection paint.

The treatment may include use of an oxide film.

In the displacement detecting device, relative displacement of the object to be examined may be detected using light received by said first light receiving element, and absolute displacement of the object to be examined may be detected using light received by said second light receiving element.

In accordance with another aspect of the present invention, there is provided a displacement detecting device, comprising: a light source configured to project light to an object to be examined, said light source being movable relative to the object to be examined; a first reflecting element being fixed to the object to be examined and including a reflection portion configured to reflect light from said light source and a non-reflection portion; a first light receiving element configured to receive light reflected by said first reflecting element; a second reflecting element being fixed to the object to be examined and including a reflection portion configured to reflect light from said light source and a non-reflection portion; a second light receiving element configured to receive light reflected by said second reflecting element; and a housing configured to accommodate and hold therein said light source, said first reflecting element, said first light receiving element, said second reflecting element and said second light receiving element, said housing having an inner wall including a portion which is configured so that, when light passed through the non-reflection portion of said first reflecting element is incident on said inner wall, said portion reduces light directed therefrom toward said second light receiving element.

The portion may include a light blocking groove.

The portion may include a light blocking member formed on said inner wall.

The portion may include a reflection surface formed on said inner wall.

In the displacement detecting device in this aspect of the invention, relative displacement of the object to be examined may be detected using light received by said first light receiving element, and absolute displacement of the object to be examined may be detected using light received by said second light receiving element.

In accordance with a further aspect of the present invention, there is provided an optical instrument, comprising: an optical member as an object to be examined; and a displacement detecting device as recited above and configured to detect displacement of the optical member.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

First of all, before explaining displacement detecting devices according to preferred embodiments of the present invention, a method of simply preventing stray light in the conventional displacement detecting device shown in FIG. 12-FIG. 15 and the problems involved therein will be described.

Figure 16:
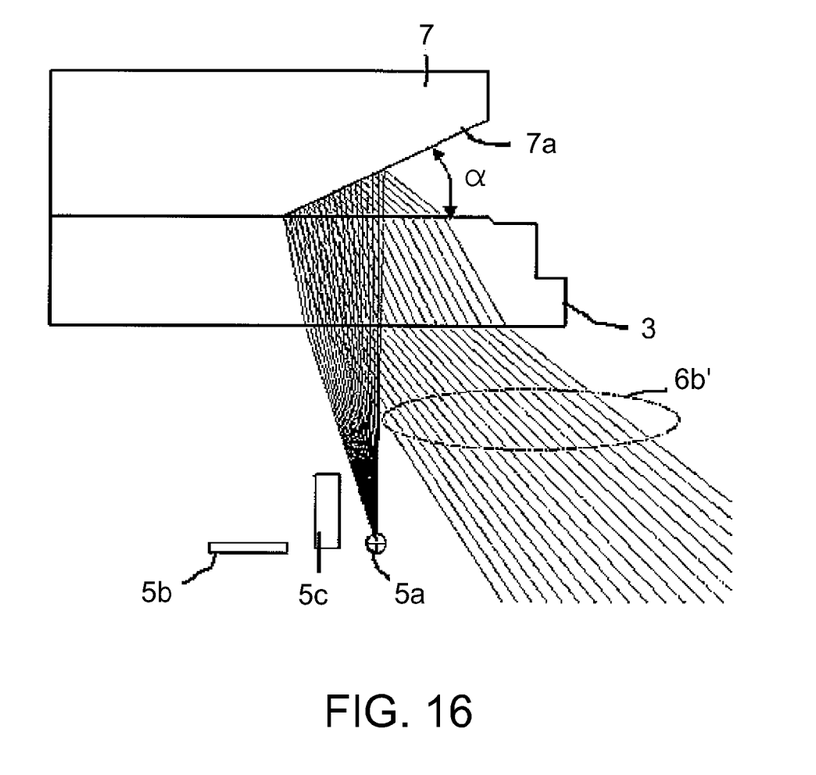
FIG. 16 is a diagram for explaining the reflection light path when the reflection surface of the abutment member has a predetermined angle.

FIG. 16 is a schematic diagram for explaining the prevention of the stray light.

As shown in FIG. 16, in order to prevent the light path 6b, in FIG. 15 from producing disturbing light to the light receiving element 5b, a reflection surface 7a is formed on the abutment 7.

In this structure, the light passed through the non-reflecting member of the reflecting element 3 is reflected by the reflection surface 7a formed in a portion of the abutment 7, toward a direction different from the direction in which the first light receiving element 5b is located. With this arrangement, incident of stray light on the first light receiving element 5b is avoided.

The displacement detecting device shown in FIG. 16 is applicable to an optical instrument such as a television zoom lens, a video camera or a digital camera.

For example, when the aforementioned displacement detecting device is applied to a driving device of a zoom lens, optical members such as a zooming member or a focusing member of the zoom lens will be provided with a peculiar operation angle with mechanical ends. Thus, it is necessary to perform drive control to avoid collision of the ends of these optical members.

In order to accomplish this, distinguishing the absolute angle phase of the optical member during the displacement detection is very important.

From such background and restrictions in regard to the outside diameter and total length of the displacement detecting device, the detecting mechanism for detecting the absolute phase described above may be one such as shown in FIG. 17.

Figure 17:
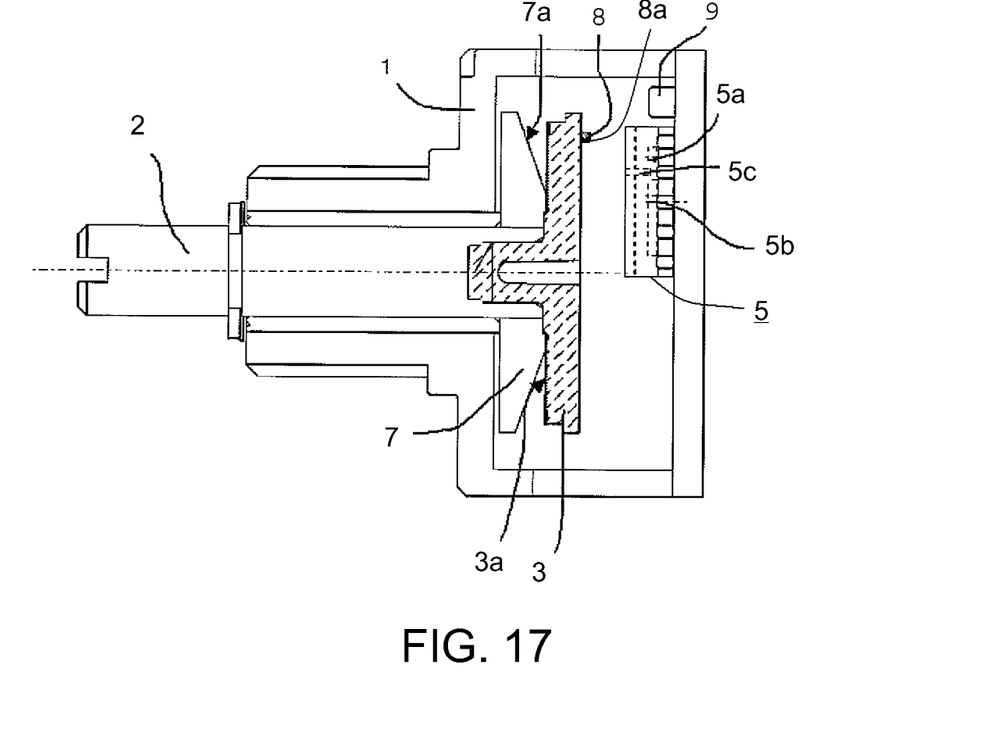
FIG. 17 is a sectional view of the structure of a displacement detecting device in which both of the relative position detection and the absolute position detection are carried out based on conventional optical detection.

In FIG. 17, a reflecting element 8 is reflecting means for the absolute angle detection, and it is disposed at a position for reflecting diffused light from the light source 5a and directing the same toward a second light receiving element 9. The second light receiving element 9 is disposed on the same plane as the first light receiving element 5b.

Figure 18:
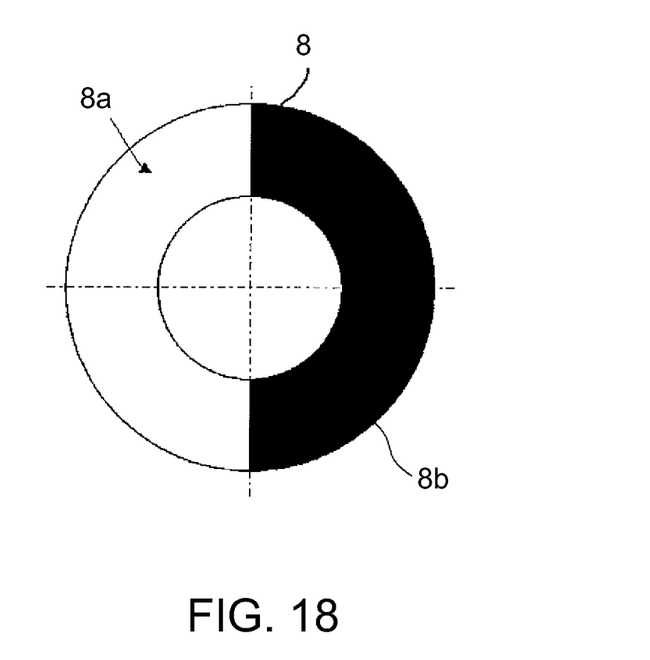
FIG. 18 is a schematic diagram for explaining a reflection pattern for the binary output, at a reflection surface to be used for the absolutely phase detection.

FIG. 18 is a schematic diagram illustrating the pattern of the reflecting element 8.

The reflecting element 8 is a ring-shaped member having a pattern which is divided into two areas of a reflection surface 8a and a non-reflection portion 8b, with a predetermined reflection intensity change for distinguishing the absolute phase.

In accordance with the presence/absence of reflection at the reflection surface 8a, the output signal from the second light receiving element 9 is outputted as a binary signal.

Figure 19:
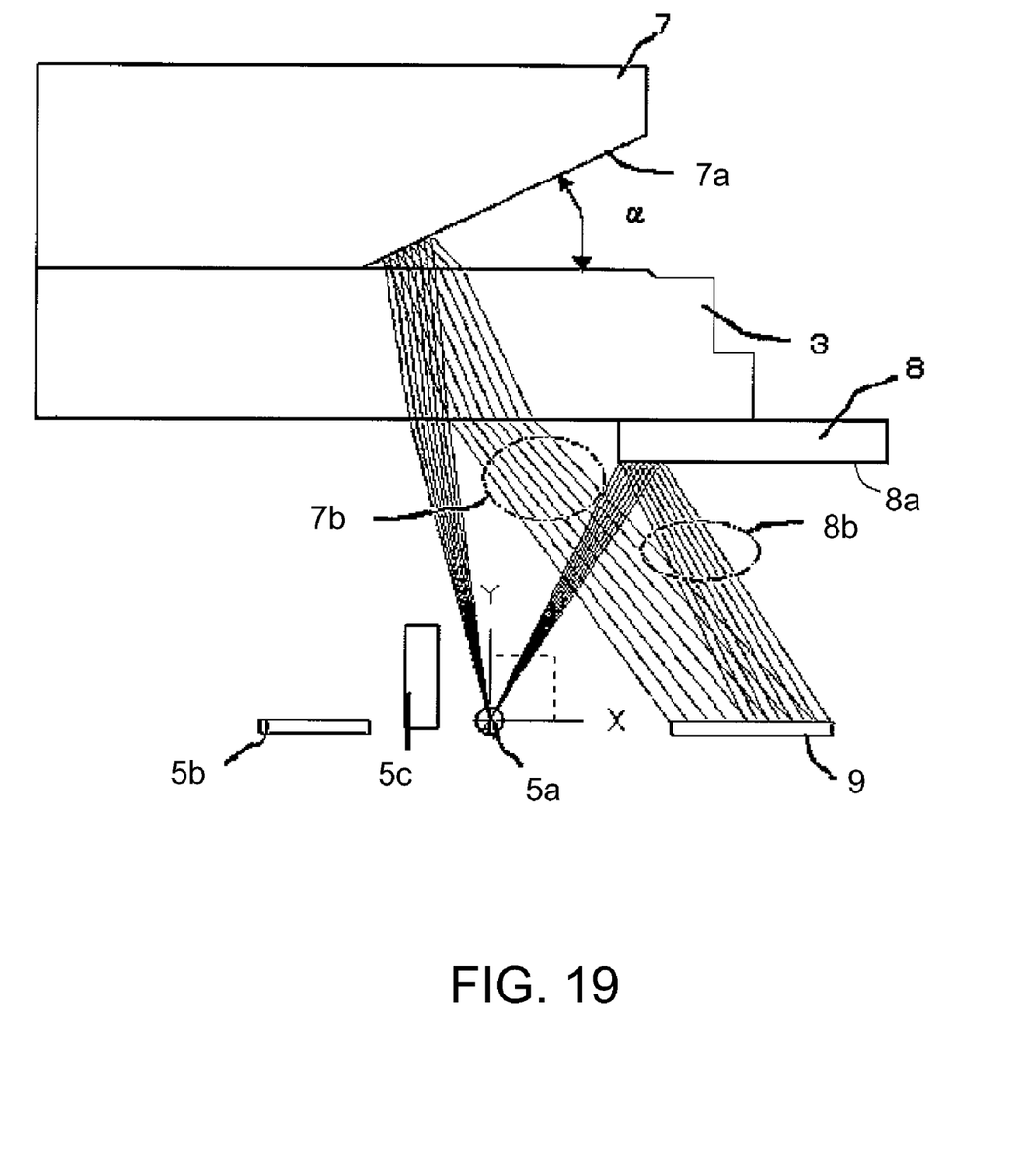
FIG. 19 is a diagram for explaining details of the dimensional and angular relationship of the reflection light path reaching the second light receiving element.

However, if the first and second light receiving elements are disposed on the same surface in an attempt to reducing the overall size of the system, as shown in FIG. 19 the light path 7b of the light reflected by the reflection surface 7a may overlap with the light path 8b of the light reflected by the reflection surface 8a. If this occurs, then, light is received by the second light receiving element 9, regardless of the presence/absence of the reflected light from the reflection surface 8a. This degrades the detection precision of the absolute displacement of the subject based on the output of the second light receiving element 9.

The stray light incident on the second light receiving element 9 without being reflected by the reflecting element 8, is not limited to the light reflected by the reflection surface 7a of the abutment 7 as described above.

For example, reflected light not passing though the non-reflecting surface 3b of the reflecting element 3 may be incident on the second light receiving element 9.

Furthermore, light which is reflected by inner wall surfaces of a housing which accommodates projection optics as well as the first and second light receiving elements may be incident on the second light receiving element 9.

The present invention concerns a displacement detecting device by which detection of relative displacement and detection of absolute displacement of an object to be examined can be carried out at high precision, while reducing the influence of various stray lights.

Next, preferred embodiments of displacement detecting device and optical instrument having the same, according to the present invention, will be explained using the drawings.

Figure 11:
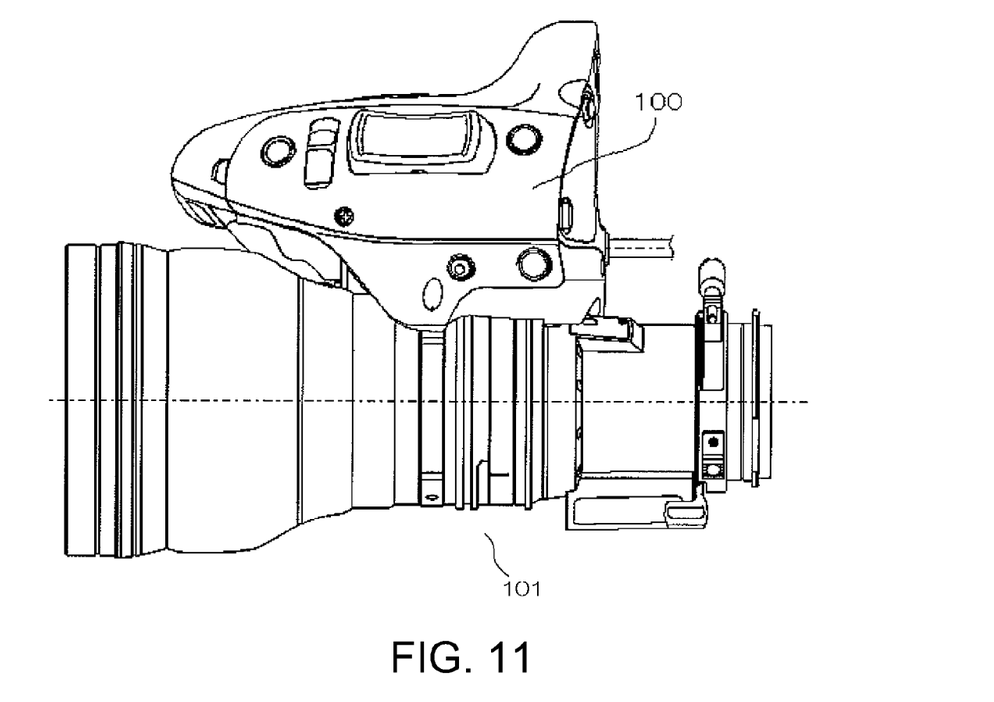
FIG. 11 is a diagram illustrating disposition of an optical instrument according to the present invention.

FIG. 11 is a main-portion schematic diagram of a displacement detecting device of the present invention when the same is applied to a television zoom lens (television lens) as an optical instrument.

Denoted in FIG. 11 at 100 is a driving device which is mounted on the outer circumference of a barrel of a television lens 101. The driving device 100 has a built-in displacement detecting device for detecting displacement information of a zooming member, a focusing member or a movable optical member such as a diaphragm, for example, constituting the television lens 101.

The structure of a displacement detecting device applicable to an optical instrument according to the present invention will be explained below.

Embodiment 1

Figure 1:
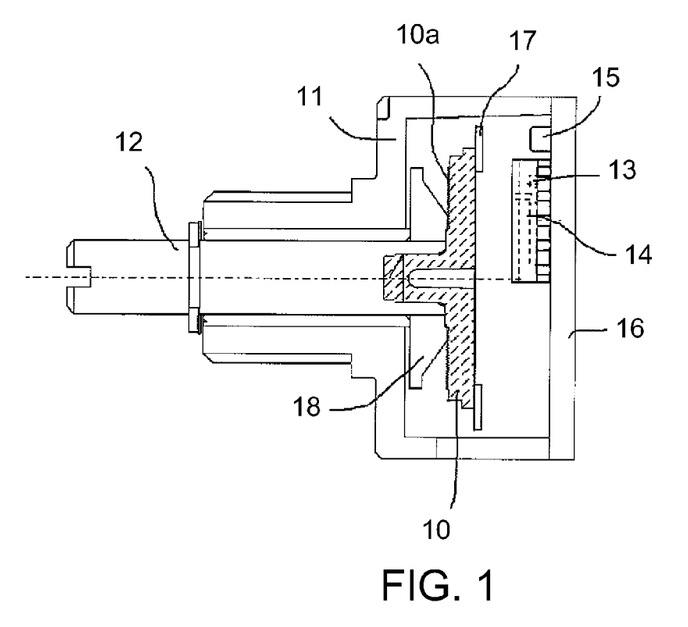
FIG. 1 is a schematic diagram of a displacement detecting device according to a first embodiment of the present invention.

FIG. 1 is a schematic diagram of a main portion of a displacement detecting device according to a first embodiment of the present invention.

In FIG. 1, denoted at 10 is a first reflecting element comprised of a transparent material in which a micro-roof array or roof prism array is regularly arranged on the back surface thereof as a reflection pattern 10a. The first reflecting element 10 is integrally fixed to a rotational shaft 12 which is pivotable relative to a fixed housing 11 constituting the displacement detecting device. Here, the rotational shaft 12 is a member used for the connection with the measurement subject (object to be examined), and this object and the rotational shaft 12 are made integral with each other. This means that the first reflecting element 10 fixedly mounted on the rotational shaft 12 is fixed to the object to be examined.

Provided at a position inside the housing 11 opposed to the first reflecting element 10 is a light source 13 for emitting diffused light. Furthermore, at the rotational shaft side of light source 13, there is a first light receiving element 14 for detecting the amount of displacement of the relative position, while on the other hand at the outer circumferential side there is a second light receiving element 15 for detecting the amount of displacement of the absolute position.

The light source 13, first light receiving element 14 and second light receiving element 15 are disposed on the same surface of a sensor substrate 16.

Furthermore, disposed at a position which is between the first reflecting element 10 and the second light receiving element 15 and which is opposed to the second light receiving element 15, is a second reflecting element 17 which rotates with the first reflecting element 10. The second reflecting element 17 has a ring-shaped pattern which is divided into two areas of a reflection portion 8a and a non-reflection portion 8b, as has been explained with reference to FIG. 18. Each of the reflection portion 8a and the non-reflection portion 8b of the second reflecting element 17 does not pass light therethrough. Namely, the second reflecting element 17 is non-transmissive. Furthermore, since the second reflecting element 17 is fixed to the first reflecting element 10, as a result, it is fixed alto to the object to be examined.

As has been described with reference to FIG. 13, the first the reflecting element 10 has a pattern bearing surface on its surface remote from the light source 13, on which pattern bearing surface a pattern comprised of a reflection portion and a non-reflection portion is regularly formed. The non-reflection portion is a light transmitting member, and the light from the light source 13 passes through the first reflecting element 10 at the angular phase of the non-reflection portion. Because of this, at a side of the first light receiving element 14 remote from the light source 13 and two light receiving elements 14 and 15, there is a stray light preventing member 18 with a reflection surface 18a having an angle to be described later in detail.

Figure 2:
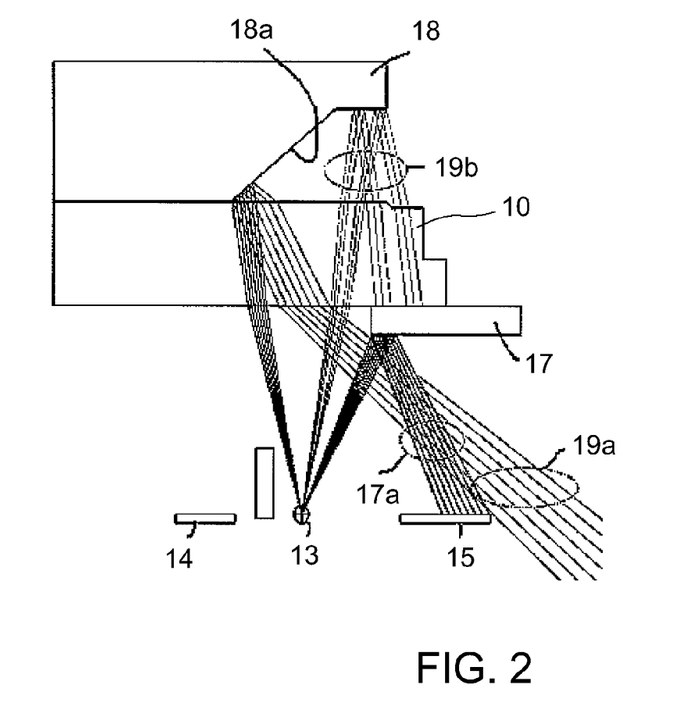
FIG. 2 is a diagram for explaining a reflection light path defined by a reflector plate.

FIG. 2 is a main-portion schematic diagram illustrating the light path of the light passed through the non-reflection portion of the first reflecting element 10 and reflected by a portion of the stray light preventing member 18.

Figure 3:
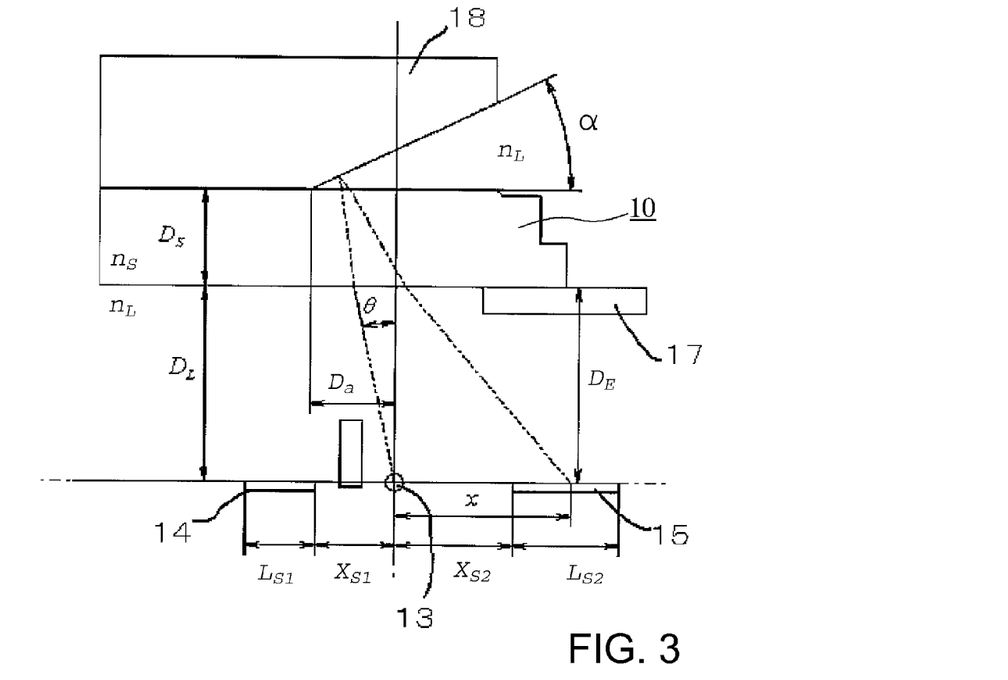
FIG. 3 is a diagram for explaining how the distance and angle of component elements are defined.

FIG. 3 is a schematic diagram illustrating the tilt angle α of the reflection surface 18a formed on the stray light preventing member 18 as well as the relationship of the distance and angle of various components.

In FIG. 2, a portion of the light from the light source 13 is reflected by the second reflecting element 17, and it is incident on the second light receiving element 15 for detecting the amount of displacement of the absolute position. The light emitted from the light source 13 and reflected by the second reflecting element 17 defines a light path 17a.

Furthermore, as shown in FIG. 2, the tilt angle α of the reflection surface 18a is so determined that the diffused light from the light source 13 and reflected by the reflection surface 18a of the stray light preventing member 18 takes a light path 19a which does not reach the second light receiving element 15.

Furthermore, with regard to the light path 19b of the reflected light reflected by the surface of the stray light preventing member 18 other than the reflection surface 18a, the second reflecting element 17 which is non-transmissive is located. In other words, the device is so structured that, by the function of the light blocking effect which the second reflecting element 17 itself has, the stray light is prevented from reaching the second light receiving element 15.

In FIG. 3, the tilt of the light ray when the principal ray direction from the center of the light source 13 toward the first reflecting element 10 is taken as the axis of ordinate is denoted by θ. The distance from the light source 13 to the first reflecting element 10 is denoted by $D_L$. The thickness of the reflecting element 10 is denoted by $D_S$. The refractive index inside the housing 11 is denoted by $n_L$. The refractive index of the first reflecting element 10 is denoted by $n_S$.

Furthermore, when an axis orthogonal to the principal ray direction from the center of the light source 13 is taken as an axis of abscissas, the shortest distance along the axis of abscissas from the light source 13 to the second light receiving element 15 is denoted by $X_{S2}$. The length of the second light receiving element 15 along the axis of abscissa is denoted by $L_{S2}$.

The tilt angle of the reflection surface 18a to the pattern bearing surface of the first reflecting element 10 is denoted by α. The lateral distance from the light source 13 to the origin where the tilt of the reflection surface 18a is generated is denoted by $D_a$. The distance from the absolute position detecting means 15 to the reflecting element 10 is denoted by $D_E$.

In order to avoid that the light path generated at the reflection surface 18a puts on the stray light to the second light receiving element 15, the tilt α of the reflection surface 18a can be set to satisfy the following relation.

$$\left[ \frac{\tan(3\theta - 2\alpha)\tan\alpha\left\{D_a - \left[D_L\tan\theta + D_S\tan\left\{\sin^{-1}\left(\frac{n_L}{n_S}\sin\theta\right)\right\}\right]\right\}}{\tan\theta\tan\alpha + 1} + D_S\tan\left\{\sin^{-1}\left(\frac{n_L}{n_S}\sin(3\theta - 2\alpha)\right)\right\} + D_E\tan(3\theta - 2\alpha) \right] - $$

$$\left[ D_L\tan\theta + D_S\tan\left\{\sin^{-1}\left(\frac{n_L}{n_S}\sin\theta\right)\right\} + \frac{\tan\theta\tan\alpha\left\{D_a - \left[D_L\tan\theta + D_S\tan\left\{\sin^{-1}\left(\frac{n_L}{n_S}\sin\theta\right)\right\}\right]\right\}}{\tan\theta\tan\alpha + 1} \right] > X_{S2} + L_{S2}$$

wherein $\pi/2 < \theta < \pi$.

If the tilt angle is set to satisfy this relation, the light path 19a shown in FIG. 2 can be achieved.

Furthermore, with regard to the range for providing the reflection surface 18a at this time, if the illuminating angle when the aforementioned equation became equivalent is denoted by $\theta_0$, the range of the axis of abscissas should be set to satisfy the following relation.

$$-D_a \sim -\left(D_L\tan\theta_0 + D_S\tan\left\{\sin^{-1}\left(\frac{n_L}{n_S}\sin\theta_0\right)\right\} + \frac{\tan\theta_0\tan\alpha\left\{D_a - \left[D_L\tan\theta_0 + D_S\tan\left\{\sin^{-1}\left(\frac{n_L}{n_S}\sin\theta_0\right)\right\}\right]\right\}}{\tan\theta_0\tan\alpha + 1}\right)$$

Figure 4:
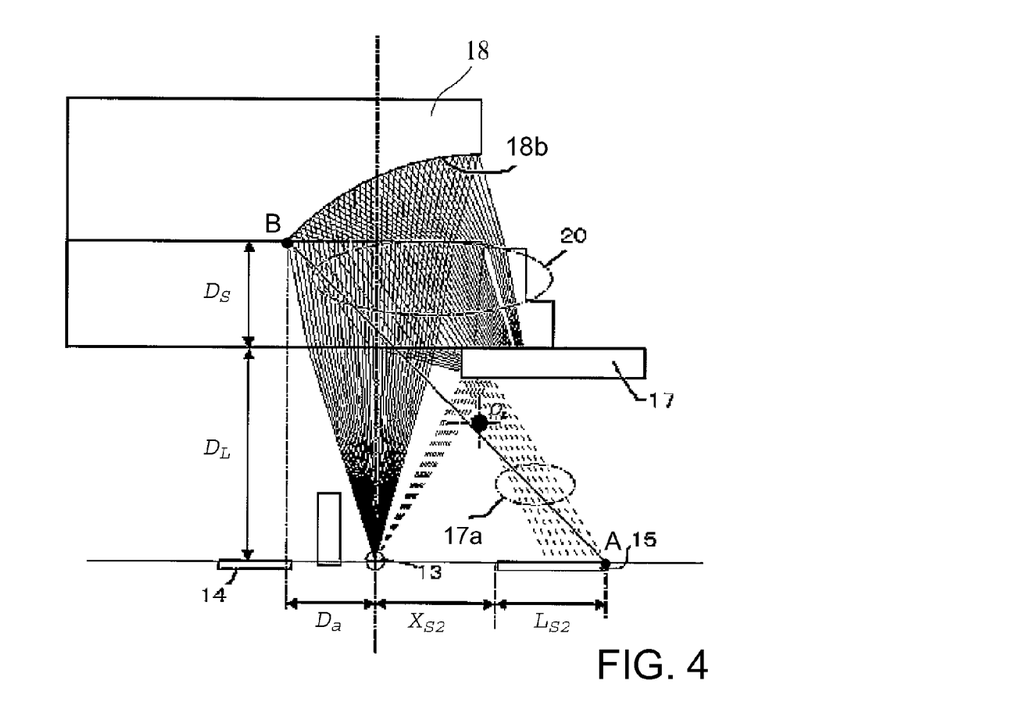
FIG. 4 is a main-portion schematic diagram for explaining another definition method of the reflection surface, in the first embodiment.

Furthermore, even without setting the aforementioned reflection angle α, the reflection surface 18a can achieve its function if it is provided as a reflection surface 18b having a curvature such as shown in FIG. 4.

As shown in FIG. 4, a straight line AB which connects a point A where the distance, on the second light receiving element, from the light source 13 becomes equal to $X_{S2}+L_{S2}$ and a point B where the distance, on the interface between the stray light prevention member 18 and the first reflecting element 10, from the light source 13 becomes equal to $D_a$, is defined.

By placing the center of curvature $O_L$ of the reflection surface 18b relative to this straight line AB so that the curvature center is disposed at a side remote from the light source 13, a light path 20 which produces no stray light to the second light receiving element 15 as well as the first light receiving element 14 can be defined.

With regard to the material of the stray light preventing member 18, a material such as phosphor bronze or aluminum alloy by which a reflection surface can be formed depending on the finishing precision of the working surface can be chosen. This simplifies the component structure and enables easier manufacture.

The present embodiment concerns a displacement detecting device which performs detection by directing diffused light from a single light source 13, based on a first light receiving element 14 which carries out high precise displacement detection using reflected light from a first reflecting element 10, and a second light receiving element 15 which distinguishes the edge of a pattern using reflected light from a second reflecting element 17. Here, the shape and tilt angle of the reflection surface 18a formed on the stray light preventing member 18 are appropriately set and, additionally, the position of the second reflecting element 17 is set appropriately. By doing so, incidence of stray light on the first light receiving element 14 and second light receiving element 15 is assuredly reduced. As a result of this, a high detection contrast can be maintained, and the precision of the displacement detecting device can be improved significantly.

Embodiment E2

Figure 5:
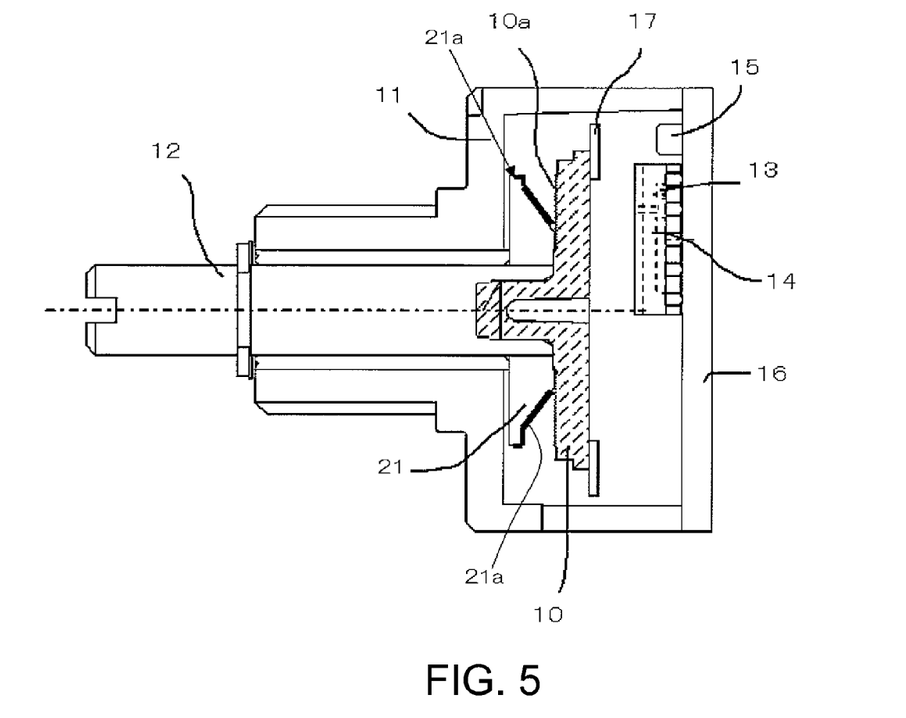
FIG. 5 is a schematic diagram of a displacement detecting device according to a second embodiment of the present invention.

FIG. 5 is a schematic diagram of a main portion of a displacement detecting device according to a second embodiment of the present invention.

The second embodiment differs from the first embodiment in that it uses a stray light prevention member 21 made of phosphor bronze having different reflection characteristic as compared with the stray light preventing member 18 of the first embodiment. The structure of the displacement detecting device except the stray light preventing member 21 is similar to that of the first embodiment.

The stray light preventing member 21 is provided with a reflection surface 21a for reflecting detection light passed through the non-reflection portion of the first reflecting element 10. The whole surface of the reflection surface 21a is coated with an antireflection paint of known type for reducing the amount of reflection.

Since the antireflection paint reduces the light quantity of incident detection light, the quantity of stray light to be incident on the second light receiving element 15 such as the light path 6b' shown in FIG. 16 can be remarkably reduced.

Thus, even without precisely setting the tilt angle α of the reflection surface 18a of the stray light preventing member 18 such as explained with reference to the first embodiment, the influence of the stray light incident on the second light receiving element 15 can be reduced and the precision of the displacement detecting device can be improved significantly.

Other than the antireflection paint, if aluminum alloy is used for the stray light preventing member 21, an oxide film forming process or anodic oxide coating process (antireflection treatment) based on anodic oxidation may desirably be done. Alternatively, a good antireflection surface having reduced reflectance is obtainable by doing a matting treatment.

In accordance with the second embodiment, not only the precision of the displacement detecting device can be improved as compared to conventional devices but also simplification of the angle setting of the reflection surface of the stray light preventing member 21 is enabled. Furthermore, since the second reflecting element 17 should have only a minimum light blocking function, the size of the second reflecting element 17 can be easily made small to a level assuring that only the detection light path 17a of the second light receiving element 15 is secured.

Thus, the structure can be simplified and light-weighted.

Embodiment 3

Figure 6:
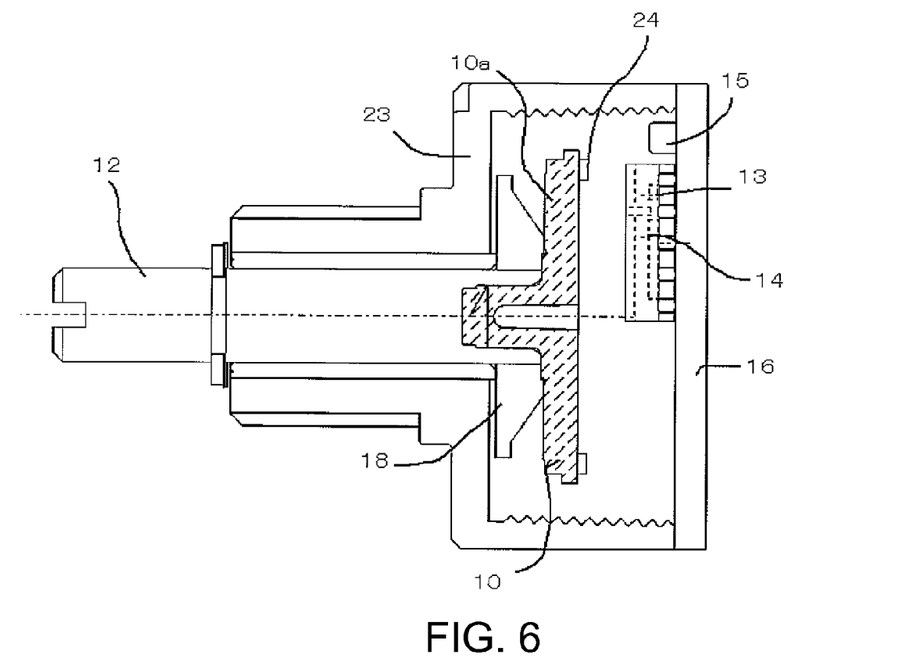
FIG. 6 is a schematic diagram of a displacement detecting device according to a third embodiment of the present invention.

FIG. 6 is schematic diagram of a main portion of a displacement detecting device according to a third embodiment of the present invention.

The displacement detecting device of the third embodiment of FIG. 6 has the same structure as that described with reference to the first or second embodiment and shown in FIG. 1 or FIG. 5, except for a housing 23 and a second reflecting element 24.

Thus, the same structural components are explained by use of the same reference numerals/characters.

Figure 7:
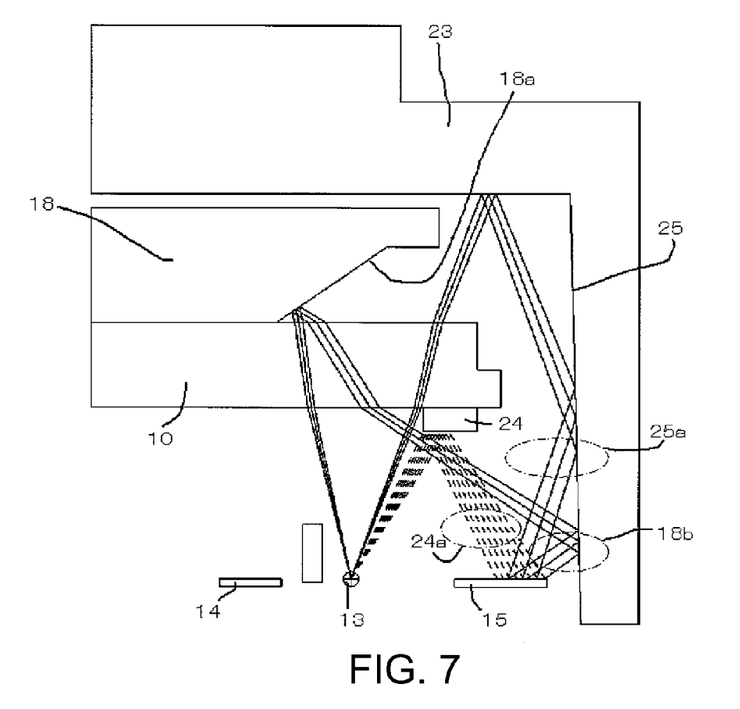
FIG. 7 is a diagram illustrating a reflection light path defined by internal reflection in a housing.

FIG. 7 is a diagram illustrating the state of stray light reflected by the inner walls of the housing 23, to explain the problems to be solved by this embodiment. Inside the housing 23, a light source 13, and first and second light receiving elements 14 and 15 are accommodated and held.

Figure 8:
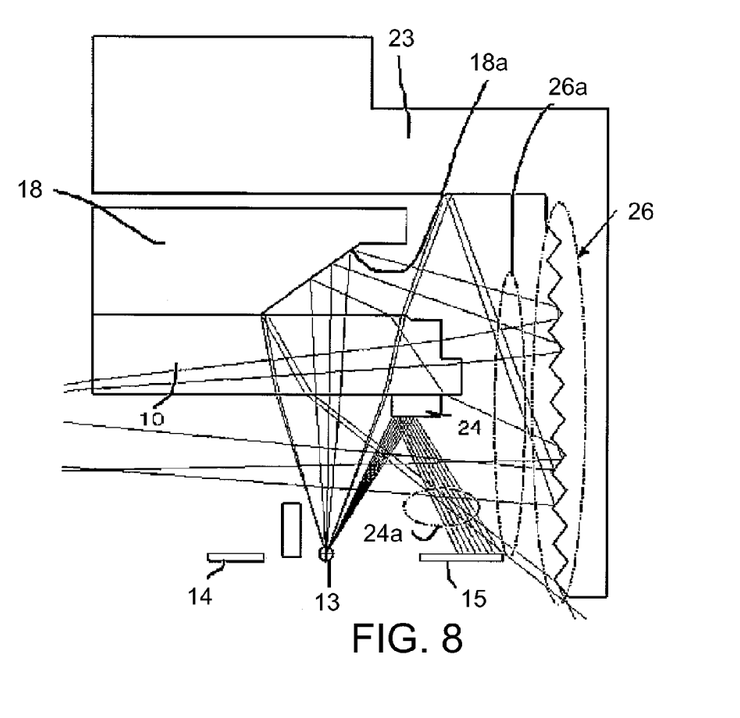
FIG. 8 is a main-portion schematic diagram for explaining a reflection light path defined by a light-blocking groove shape, in the third embodiment of the present invention.

FIG. 8 is a schematic diagram showing, with reference to the structure of the third embodiment, a reflection light path 26a which is defined by light passed through the non-reflection portion of the first reflecting element 10 and then reflected by a light blocking member (light blocking groove) 26 which is formed in the inner wall of the housing 23.

The light from the light source 13 passes through the non-reflection portion of the first reflecting element 10 and then it is reflected at various points of the inner structure of the housing 23, whereby stray light is produced therefrom.

Among the reflected stray light, stray light which enters the first light receiving element 14 or second light receiving element 15 is disturbing light which adversely influences the detection precision. Among them, stray light caused by primary reflection by a mechanical component has a particularly large light quantity and has a strong influence. However, with regard to the light path defined by repeated reflection by mechanical components, since the light quantity gradually decreases, the influence thereof becomes gradually weak.

In the first and second embodiments, stray light by primary reflection is prevented. In the third embodiment, as compared therewith, stray light by secondary reflection as well is prevented furthermore.

For example, as shown in FIG. 7, if a light path covering a light path 24a for detecting the absolute position and defined by the second reflecting element 24 is created by stray light, such light path would provide disturbing light to the second light receiving element 15.

More specifically, a reflection light path 25a created by repeated reflection by the inner wall 25 of the housing 2 and a reflection light path 18b created by reflection, by the inner wall 25, of the reflected light path of the stray light preventing member 18 will provide disturbing light.

In order to effective prevent the stray light advancing along such reflection light path 25a and reflection light path 18b from being incident on the second light receiving element, the housing 23 is provided with a light blocking member 26 having a known light blocking groove shape as shown in FIG. 8. With this light blocking member 26, a reflection light path 26a is created such that incidence of the disturbing light onto the second light receiving element 15 is prevented. Although not shown in the drawing, the provision of the light blocking part 26 is effective also to reduce incidence of disturbing light onto the first light receiving element 14.

Here, with regard to the reflection light path created by the reflection surface 18a or reflection surface 18b described with reference to the first embodiment or the reflection surface 21a being coated with an antireflection paint as described with reference to the second embodiment, substantially the same advantageous effect is attainable.

Furthermore, with regard to the light blocking shape of the light blocking member 26, in addition to the groove shape shown in FIG. 8, any shape such as a stepwise shape or wavy shape, for example, can be used provided that it can create a light path not directing the light toward the light receiving element for the detection light.

Furthermore, the element to be provided at the inner wall of the housing 23 is not limited to a light blocking groove. A similar effect is obtainable by antireflection treatment such as an antireflection paint.

In accordance with the third embodiment, disturbing light caused by a reflection light path inside the housing 23 can be reduced. Therefore, a higher brightness contrast of the detection light can be maintained, such that electric division of the output of the second light receiving element 15 can be done at higher precision. Thus, a higher resolution can be realized.

It should be noted that, in the present embodiment, the aforementioned structure may be added to the structure of the first or second embodiment or, alternatively, it may be used completely separately from the first and second embodiments.

Embodiment 4

Figure 9:
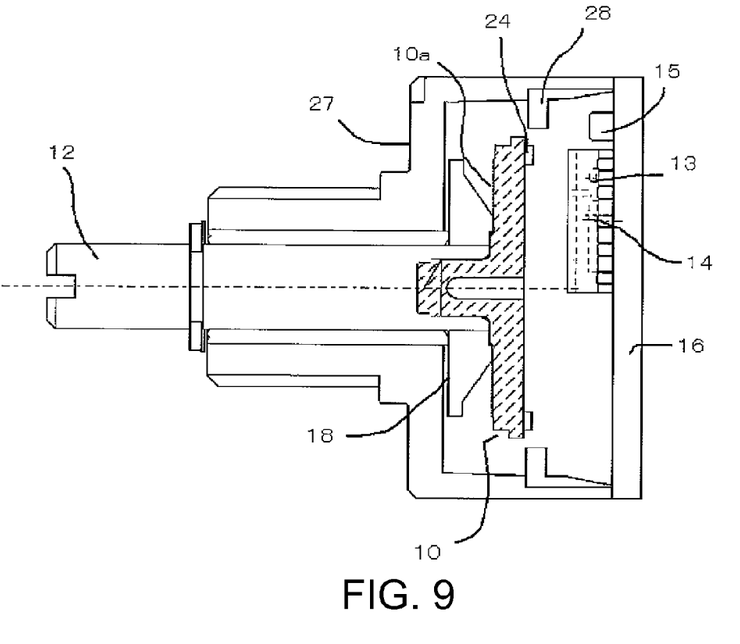
FIG. 9 is a schematic diagram of a displacement detecting device according to a fourth embodiment of the present invention.

FIG. 9 is a schematic diagram of a main portion of a displacement detecting device according to a fourth embodiment of the present invention.

Figure 10:
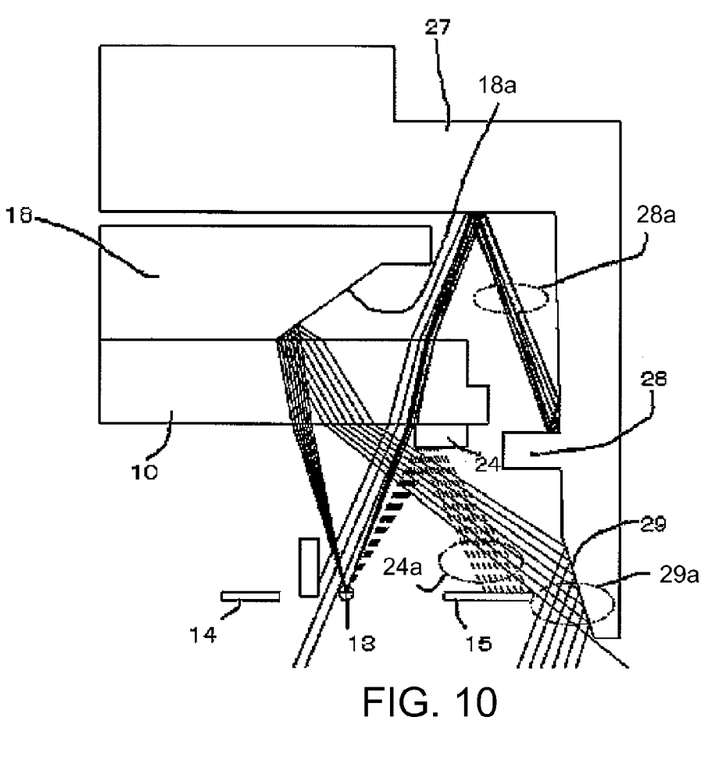
FIG. 10 is a main-portion schematic diagram for explaining a reflection light path defined by a light-blocking groove shape, in the fourth embodiment of the present invention.

FIG. 10 is a diagram illustrating a light path of stray light in the structure of the fourth embodiment.

In the embodiment, since the structure except a housing 27 is the same as the structure of the third embodiment described above, those components are explained by use of the same reference numerals/characters.

The fourth embodiment is configured to prevent stray light produced by the secondary reflection as in the third embodiment.

As shown in FIG. 7, the light path which produces disturbing light based on the internal reflection inside the housing is a reflection light path 25a and reflection light path 18b.

In this embodiment, in order to effectively prevent stray light following these reflection light paths 25a, the housing 27 is provided with a light blocking member 28 as shown in FIG. 9.

As shown in FIG. 10, by means of the light blocking member 28 formed in the housing 27, the reflection light path 25a in FIG. 7 is changed into a into reflection light path 28a. By doing so, incidence of disturbing light to the second light receiving element 15 is prevented.

Furthermore, in the region in which the reflection light path 18b is reflected by housing 27, a portion of the housing 27 is formed into a reflection surface 29. By changing the reflection light path 18b into the reflection light path 29a by means of this reflection surface 29, incidence of disturbing light onto the second light receiving element 15 is effectively prevented.

In the fourth embodiment as well, like the third embodiment, by reducing the disturbing light to be produced by the reflection light path in the housing, a higher brightness contrast of the detection light can be maintained.

As a result, electric division of the output from the second light receiving element 15 can be done at higher precision, and higher resolution detection is attainable as a displacement detecting device.

Although the foregoing description has been made with reference to some preferred embodiments of the present invention, as a mater of course, the invention is not limited to these. Various changes and deformations are possible within the scope of the invention.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2008-042754 filed Feb. 25, 2008, for which is hereby incorporated by reference.

What is claimed is:

1. A displacement detecting device, comprising:
   a light source configured to project light to an object to be examined, said light source being movable relative to the object to be examined;
   a first reflecting element being fixed to the object to be examined and including a reflection portion configured to reflect light from said light source and a non-reflection portion;
   a first light receiving element configured to receive light reflected by said first reflecting element;
   a second reflecting element being fixed to the object to be examined and including a reflection portion configured to reflect light from said light source and a non-reflection portion; and
   a second light receiving element configured to receive light reflected by said second reflecting element;
   wherein said second reflecting element is disposed at a light path through which at least a portion of light from said light source and advancing via said first reflecting element is directed to said second light receiving element.

2. A displacement detecting device according to claim 1, further comprising a stray light preventing member disposed at a side of said first reflecting element remote from said first and second light receiving elements, said stray light preventing member having a reflection surface configured to reflect light passed through the non-reflection portion of said first reflecting element to a direction different from the direction toward said first light receiving element, wherein said second reflecting element is disposed at a light path along which at least a portion of light from said light source passed through the non-reflection portion of said first reflecting element and then reflected by said stray light preventing member is directed to said second light receiving element.

3. A displacement detecting device according to claim 1, wherein said stray light preventing member has been treated to decrease reflectance to light passed through the non-reflection portion of said first reflecting element.

4. A displacement detecting device according to claim 3, wherein the treatment includes use of an antireflection paint.

5. A displacement detecting device according to claim 3, wherein the treatment includes use of an oxide film.

6. A displacement detecting device according to claim 1, wherein relative displacement of the object to be examined is detected using light received by said first light receiving element, and absolute position of the object to be examined is detected using light received by said second light receiving element.

7. An optical instrument, comprising:
   an optical member as an object to be examined; and
   a displacement detecting device as recited in claim 1 and configured to detect displacement of the optical member.

8. A displacement detecting device, comprising:
   a light source configured to project light to an object to be examined, said light source being movable relative to the object to be examined;
   a first reflecting element being fixed to the object to be examined and including a reflection portion configured to reflect light from said light source and a non-reflection portion;
   a first light receiving element configured to receive light reflected by said first reflecting element;
   a second reflecting element being fixed to the object to be examined and including a reflection portion configured to reflect light from said light source and a non-reflection portion;
   a second light receiving element configured to receive light reflected by said second reflecting element; and
   a housing configured to accommodate and hold therein said light source, said first reflecting element, said first light receiving element, said second reflecting element and said second light receiving element, said housing having an inner wall including a portion which is configured so that, when light passed through the non-reflection portion of said first reflecting element is incident on said inner wall, said portion reduces light directed therefrom toward said second light receiving element.

9. A displacement detecting device according to claim 8, wherein said portion includes a light blocking groove.

10. A displacement detecting device according to claim 8, wherein said portion includes a light blocking member formed on said inner wall.

11. A displacement detecting device according to claim 8, wherein said portion includes a reflection surface formed on said inner wall.

12. A displacement detecting device according to claim 8, wherein relative displacement of the object to be examined is detected using light received by said first light receiving element, and absolute position of the object to be examined is detected using light received by said second light receiving element.

13. An optical instrument, comprising:
- an optical member as an object to be examined; and
- a displacement detecting device as recited in claim 8 and configured to detect displacement of the optical member.

* * * * *